March 18, 1958  A. H. WARTH  2,827,192
COMPOSITION FOR PRODUCING JAR RINGS
Filed Sept. 23, 1954

INVENTOR
Albin H. Warth

BY Cushman, Darby & Cushman
ATTORNEYS

United States Patent Office 2,827,192
Patented Mar. 18, 1958

2,827,192

COMPOSITION FOR PRODUCING JAR RINGS

Albin H. Warth, Baltimore, Md., assignor to Crown Cork & Seal Company, Inc., Baltimore, Md., a corporation of New York Application September 23, 1954, Serial No. 457,832

29 Claims. (Cl. 215—40)

The present invention relates to rubber jar rings and compositions useful in preparing the same.

It is an object of the present invention to prepare a wax composition suitable for incorporation in rubber jar rings.

Another object is to prevent sticking of the closure to the lip of the container when rubber jar rings are employed.

A further object is to increase the chemical resistance of rubber jar rings.

An additional object is to eliminate the use of low melting point paraffin wax fractions which have a tendency to degrade the rubber after a long period of time.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished by the use of a particular wax composition which is then blended with the rubber prior to forming the ring.

The make-up of the wax composition by weight is as follows:

| | Percent |
|---|---|
| Lanolin or wool fat | 1 to 5 |
| Polyethylene | 1 to 6 |
| Silicone oil | .01 to 0.2 |
| Paraffin wax | 59 to 97.5 |
| Microcrystalline wax | 0 to 30 |

A preferred composition is:

COMPOSITION A

| | |
|---|---|
| Lanolin | 3 parts. |
| Polyethylene | 3 parts. |
| Methyl silicone oil | .024 part. |
| Paraffin wax | 84 parts, melting point 130 to 136° F. |
| Microcrystalline wax | 10 parts, melting point 180 to 185° F. |

The lanolin or wool fat gives lubricating qualities and flexibility to rubber jar rings and other container gaskets embodying the composition and eliminates the slack wax effect, i. e., softness of the wax. The lanolin permits a bloom to form on the waxed jar rings that is highly useful in preventing sticking of the closure to the lip of the container. It also imparts firmness and chemical resistance to the ring or gasket.

The polyethylene imparts firmness and chemical resistance to the ring. Surprisingly, I have found that the anhydrous lanolin and polyethylene of about 2000 molecular weight can be well blended despite the fact that they do not resemble each other physically or chemically. This discovery opens up an entirely new field of hardening agents for lanolin, and is applicable to the cosmetic and pharmaceutical industries.

The silicone, specifically a dimethyl siloxane oil, improves the lubricating qualities of the composition. Other dialkyl siloxane-diaryl siloxane polymers of oil consistency, (e. g., Dow-Corning 200 silicone oils, dialkyl siloxane polymer oils) can be employed. Dow-Corning 200 oils are dimethyl siloxanes, as is shown in Dow-Corning Silicone Notebook, Reference No. 2003, issued June 1952, page 4. While it is preferred to have silicone present in the indicated amounts, this component can be eliminated entirely with the attendant sacrifice in lubricating qualities.

The paraffin wax imparts body and is the major element of the composition. In place of paraffin wax, other hydrocarbon waxes, e. g., microcrystalline wax, can be employed. The low melting point paraffin wax fractions have a tendency to degrade the rubber after a long period of time and it is an advantage of the present composition that their use can be dispensed with. Accordingly, the hydrocarbon wax, specifically paraffin wax should have a melting point of at least 128° F., preferably from 130 to 136° F. and the wax should be fully refined so that paraffin oil and soft waxes melting below 115° F. will have been simultaneously eliminated.

The microcrystalline wax, when used along with the paraffin wax, serves as a dispersing agent. Although its use is optional, it is preferred to have the microcrystalline wax present.

In formulating a wax composition such as A, which is an example of a preferred composition the polyethylene that is used has a molecular weight of about 2000. Very much higher molecular weight polyethylenes are not compatible with waxes. The lanolin which is used is known as "anhydrous lanolin." The paraffin wax is of about 130 to 136° F. melting point. The polyethylene tends to neutralize the low melting constituents of the paraffin wax, but decreases its pliability. Anhydrous lanolin is added not only to increase the pliability of the resultant wax, but to offset the tackiness caused by the addition of microcrystalline wax; the latter being devoid of lubricity.

The components of the above composition, e. g., Composition A, can be blended in any conventional manner, for example, in a paddle mixer or in a rotating cylinder. The first step in the preparation of the wax for the rubber jar rings is to prepare "silicone wax mix," by melting 25 parts of polyethylene of about 2000 molecular weight, adding 50 parts of microcrystalline wax (about 180° F. melting point), and 25 parts of anhydrous lanolin. To this melt is added 0.2 part of silicone Dow-Corning 200, which is mechanically dispersed by means of a high speed stirrer.

A Mason jar ring wax is then compounded from 88 parts of fully refined paraffin wax of 130 to 136° F. melting point and 12 parts of the above-mentioned silicone wax mix.

COMPOSITION B

The final composition comprises:

| | Parts |
|---|---|
| Paraffin (m. pt. 130–136° F.) | 88 |
| Polyethylene (mol. wt. 2000) | 3 |
| Microcrystalline wax | 3 |
| Anhydrous lanolin | 3 |
| Silicone D. C. 200 | .024 |

A similar Mason jar ring wax, somewhat harder and of higher melting point, and superior lubricity can be made by substituting for the microcrystalline wax in the above Example B, a Fischer-Tropsch pure hydrocarbon wax having a melting point in the range of 200–220° F.

COMPOSITION C

A Mason jar ring wax is prepared from 88 percent paraffin, 133 to 135° F. melting point
12 percent silicone wax comprised of
25 parts polyethylene (about 2000 molecular wt.)
25 parts anhydrous lanolin.
50 parts Fischer-Tropsch synthetic paraffin wax (212° F. melting point).
0.2 part silicone oil The Mason jar ring wax so produced when used in rubber jar ring compositions will result in a firmer and harder jar ring, which will not soften in the steaming operation employed at the time that the rubber ring lined closures are affixed to the jars filled with the food products. The use of Fischer-Tropsch synthetic wax as in the above composition has the advantage over the use of microcrystalline wax in that the Fischer-Tropsch wax is devoid of tackiness. The Fischer-Tropsch wax can be used in an amount up to 15% of the total hydrocarbon wax.

In practice, 6 to 44% of the above wax composition is incorporated with 94 to 56% of the rubbers conventionally employed in making jar rings. Such rubber can be natural rubber, Buna N (rubbery butadiene-acrylonitrile copolymer), GRS (rubbery butadiene-styrene copolymer) Butyl rubber (isobutylene-butadiene copolymer) or mixtures of the same, e. g., 50% natural rubber–50% GRS. Other conjugated butadiene rubbery homopolymers and copolymers can be employed, but less advantageously. The term "a conjugated butadiene rubbery polymer," used in the specification and claims, includes both polymers and copolymers. Typical examples of conjugated butadienes are butadiene 1,3; isoprene, hexadiene 1,3; piperylene, chloroprene. Typical examples of copolymerizable materials are styrene, alpha methyl styrene, vinyl pyridine, acrylonitrile, paramethyl styrene, acrylic and methacrylic acid esters, e. g., methyl acrylate, isoolefins, e. g., isobutylene. Other rubbery polymers, such as polyisobutylene or isoolefin vinyl-aromatic hydrocarbon copolymers, e. g., isobutylene-styrene copolymers can be employed. Preferably, about 40% of the wax composition is included with 60% of the rubber.

*Example I*

| | Percent |
|---|---|
| Composition A, B or C | 40 |
| Natural rubber | 60 |

*Example II*

| | |
|---|---|
| Composition A, B or C | 40 |
| GRS | 60 |

*Example III*

| | |
|---|---|
| Composition A, B or C | 40 |
| Natural rubber | 45.6 |
| GRS | 14.4 |

Composition A and the rubber can be mixed in conventional fashion, such as on a rubber mill. The mixtures contain not only the rubber hydrocarbons with the customary adjuncts, in small amounts, of vulcanizing agent, accelerator, anti-oxidant, pigment, etc., but also a substantial and in some cases very large amount of mineral fillers. The final composition has the following range of proportions:

| | Parts |
|---|---|
| Rubber hydrocarbons | 25 to 35 |
| Zinc oxide | 1 to 2 |
| Stearic acid | ½ to 2 |
| Accelerator | ½ to ¾ |
| Sulfur | ¾ to 1¼ |
| Pigment, e. g., red iron oxide | 1/24 to 3 |
| Mineral filler (talc, clay, whiting, etc.) | 40 to 59 |
| Antioxidant | ¼ to ½ |
| Wax composition A or B or C | 8 to 20 |

A typical formula within the above range can comprise the minimum amount recited of each material. The rubber hydrocarbons as aforementioned can be either natural or synthetic or mixture thereof. Where GRS or similar conjugated butadiene synthetic rubbery polymer is employed, it is advantageously used in the proportion of 6 to 9 parts with 19 to 26 parts of pale crepe, although the proportion of synthetic to natural rubber can be varied considerably, preferably if parts of GRS are used with 19 parts of natural crepe rubber.

The vulcanized jar ring can comprise 25–35% of a conjugated butadiene rubbery polymer selected from the group consisting of natural and synthetic rubber, 2–20% of a wax composition comprising 3% lanolin, 3% polyethylene, 84% paraffin wax, 10% microcrystalline wax and 2/10% methyl silicone oil, and there can also be present 40–59% of mineral filler, as well as a rubber accelerator and a rubber vulcanizing agent.

The rubber jar rings can then be formed, for example, by extruding in conventional fashion through an annular orifice to form a seamless tubing and then slicing off the rings from the tubing.

Jar rings made according to the present invention are highly successful in preventing the closure from sticking to the lip of the container when, for example, the container is made of glass and the closure is made of glass or metal, such as steel or brass.

Figure 1:
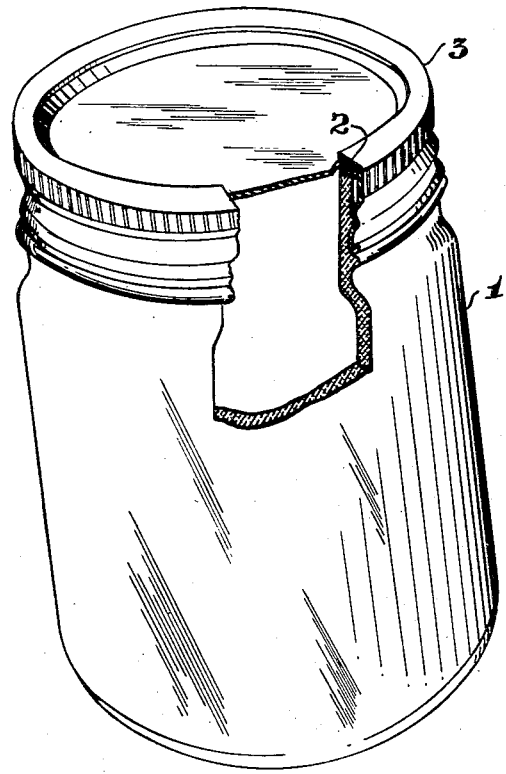
Figure 1 is a perspective view, partially in section, of a jar incorporating the ring of the present invention.
Figure 2:
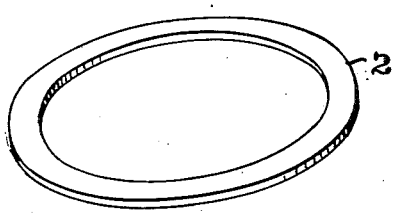
Figure 2 is a top view of a jar ring made of the present composition.

Referring to the drawings, a glass container 1, such as a Mason jar for example, has a jar ring 2 made of the composition of the present invention attached thereto in the usual manner and a cap 3 which can be made of metal, such as brass, steel, etc., or other conventional material is attached to the container to provide a seal with the jar ring in conventional manner.

What is claimed is:

1. A container including a body portion, a closure and a gasket made from a composition comprising about 56 to 94% of a conjugated butadiene rubbery polymer, about 6 to 44% of a wax composition, said percentages being based on these two components of the final gasket composition said wax composition comprising abut 1 to 5% lanolin, about 1 to 6% polyethylene, about 89 to 97.5% hydrocarbon wax having a melting point of at least 128° F.; and a mineral filler, said gasket preventing the closure from sticking to the body portion.

2. The container of claim 1, wherein the ring contains a minor portion, less than 0.2% of a silicone oil.

3. A container ring gasket comprising about 25 to 35% of rubber hydrocarbons selected from the group consisting of natural and synthetic rubbers and about 2 to 20% of a wax composition, said wax composition comprising about 1 to 5% lanolin, about 1 to 6% polyethylene and about 59 to 97.5% hydrocarbon wax having a melting point of at least 128° F.

4. The gasket of claim 3, wherein the wax comprises fully refined paraffin wax and up to about 30% microcrystalline wax.

5. The gasket of claim 4 including about .01 to 0.2% silicone oil.

6. A vulcanized jar ring comprising 25 to 35% of a conjugated butadiene rubbery polymer selected from the group consisting of natural and synthetic rubbers, 2 to 20% of a wax composition, said wax composition comprising 3% lanolin, 3% polyethylene, 84% paraffin wax, 10% microcrystalline wax and 0.024% methyl silicone oil, said jar ring also including 40 to 59% of mineral filler, a rubber accelerator and a rubber vulcanizing agent.

7. A composition of matter comprising a mixture of anhydrous lanolin and polyethylene having a molecular weight of about 2000.

8. A composition of matter comprising a major proportion of a hydrocarbon wax having a melting point of at least 128° F. together with a minor proportion of anhydrous lanolin and a minor proportion of polyethylene of molecular weight about 2000.

9. The composition of claim 8, wherein the lanolin is from about 1 to 5%, the polyethylene is from about 1 to 6% and the hydrocarbon wax is from about 59 to 97.5%.

10. The composition of claim 9, including about 0.01 to 0.2% of a silicone oil.

11. The composition of claim 8, including a silicone oil.

12. A composition according to claim 8, including about 0.01 to 0.2% of a dimethyl siloxane oil.

13. A composition comprising about 56 to 94% of a rubbery polymer and about 6 to 44% of the composition of claim 8.

14. A composition comprising about 56 to 94 parts of a member selected from the group consisting of an isoprene polymer and conjugated butadiene rubbery polymer and about 6 to 44 parts of a wax composition comprising about 1 to 6% anhydrous lanolin, 1 to 5% polyethylene of molecular weight about 2000 and about 59 to 97.5% of a hydrocarbon wax having a melting point of at least 128° F.

15. The composition of claim 14, wherein the wax comprises paraffin wax and up to 15% of a Fischer-Tropsch synthetic paraffin wax having a melting point of at least 200° F. based on the total weight of the wax composition.

16. The composition of claim 15, including 0.1 to 0.5% of silicone oil.

17. The composition of claim 14, wherein the rubbery polymer comprises natural rubber.

18. The composition of claim 14, wherein the rubbery polymer comprises butadiene-styrene copolymer.

19. The composition of claim 14, wherein the rubbery polymer comprises butadiene-acrylonitrile copolymer.

20. A composition of matter comprising a mixture of anhydrous lanolin and polyethylene.

References Cited in the file of this patent

UNITED STATES PATENTS

| | | |
|---|---|---|
| 1,842,429 | Scofield | Jan. 26, 1932 |
| 2,180,081 | Mueller-Aunradi et al. | Nov. 14, 1939 |
| 2,299,805 | Denman | Oct. 27, 1942 |
| 2,402,551 | Holt | June 25, 1946 |
| 2,415,276 | Buckley et al. | Feb. 4, 1947 |